United States Patent
Luppi et al.

(10) Patent No.: US 8,038,368 B2
(45) Date of Patent: Oct. 18, 2011

(54) METHOD AND SYSTEM FOR STARTING UP A PIPELINE

(75) Inventors: Ange Luppi, Nimes (FR); Roland Daly, Montpellier (FR)

(73) Assignee: Technip France (FR)

( * ) Notice: Subject to any disclaimer, the term of this patent is extended or adjusted under 35 U.S.C. 154(b) by 680 days.

(21) Appl. No.: 10/593,211

(22) PCT Filed: Mar. 9, 2005
(Under 37 CFR 1.47)

(86) PCT No.: PCT/FR2005/000558
§ 371 (c)(1),
(2), (4) Date: Oct. 15, 2007

(87) PCT Pub. No.: WO2005/100741
PCT Pub. Date: Oct. 27, 2005

(65) Prior Publication Data
US 2008/0193219 A1 Aug. 14, 2008

(30) Foreign Application Priority Data
Mar. 16, 2004 (FR) ..................................... 04 02695

(51) Int. Cl.
*E21B 43/013* (2006.01)
*F16L 1/26* (2006.01)
(52) U.S. Cl. ........................ 405/170; 405/168.1; 166/343
(58) Field of Classification Search ............... 405/154.1, 405/158, 168.1, 168.4, 169, 170, 172; 166/341, 166/343–347
See application file for complete search history.

(56) References Cited

U.S. PATENT DOCUMENTS

| | | | | |
|---|---|---|---|---|
| 3,931,670 | A | | 1/1976 | Arnold ............................ 29/157 |
| 4,208,055 | A | * | 6/1980 | Noensie et al. ............... 277/314 |
| 4,529,334 | A | * | 7/1985 | Ortloff ........................ 405/224.2 |
| 4,735,267 | A | * | 4/1988 | Stevens ........................ 166/345 |
| 4,906,137 | A | * | 3/1990 | Maloberti et al. ......... 405/224.3 |
| 5,975,803 | A | | 11/1999 | Mackinnon |
| 6,321,844 | B1 | * | 11/2001 | Thiebaud et al. ............. 166/345 |
| 6,595,725 | B1 | | 7/2003 | Shotbolt ..................... 405/224.2 |
| 6,854,930 | B2 | * | 2/2005 | Pionetti ........................... 405/172 |
| 7,025,535 | B2 | * | 4/2006 | Chiesa et al. .................. 405/169 |
| 2002/0157833 | A1 | * | 10/2002 | Wilson .......................... 166/344 |
| 2004/0218981 | A1 | * | 11/2004 | Chenin ......................... 405/169 |
| 2005/0002740 | A1 | * | 1/2005 | Andres ....................... 405/184.4 |
| 2005/0271476 | A1 | * | 12/2005 | Chiesa et al. .................. 405/172 |
| 2006/0056918 | A1 | * | 3/2006 | Luppi ........................... 405/169 |

OTHER PUBLICATIONS

International Search Report PCT/FR2005/000558 Jun. 3, 2005.

* cited by examiner

*Primary Examiner* — Tara Mayo-Pinnock
(74) *Attorney, Agent, or Firm* — Ostrolenk Faber LLP

(57) ABSTRACT

A system for starting up a flowline suitable for conveying hydrocarbons is provided. The flowline is extended over the seabed from a wellhead and terminated at a joint end. The joint end is suitable for connection to a subsea riser extended in a catenary. The flowline is able to stretch and a lock fixes the joint end with respect to the seabed for maintaining the flowline in its stretched position, and preventing its return movement.

7 Claims, 4 Drawing Sheets

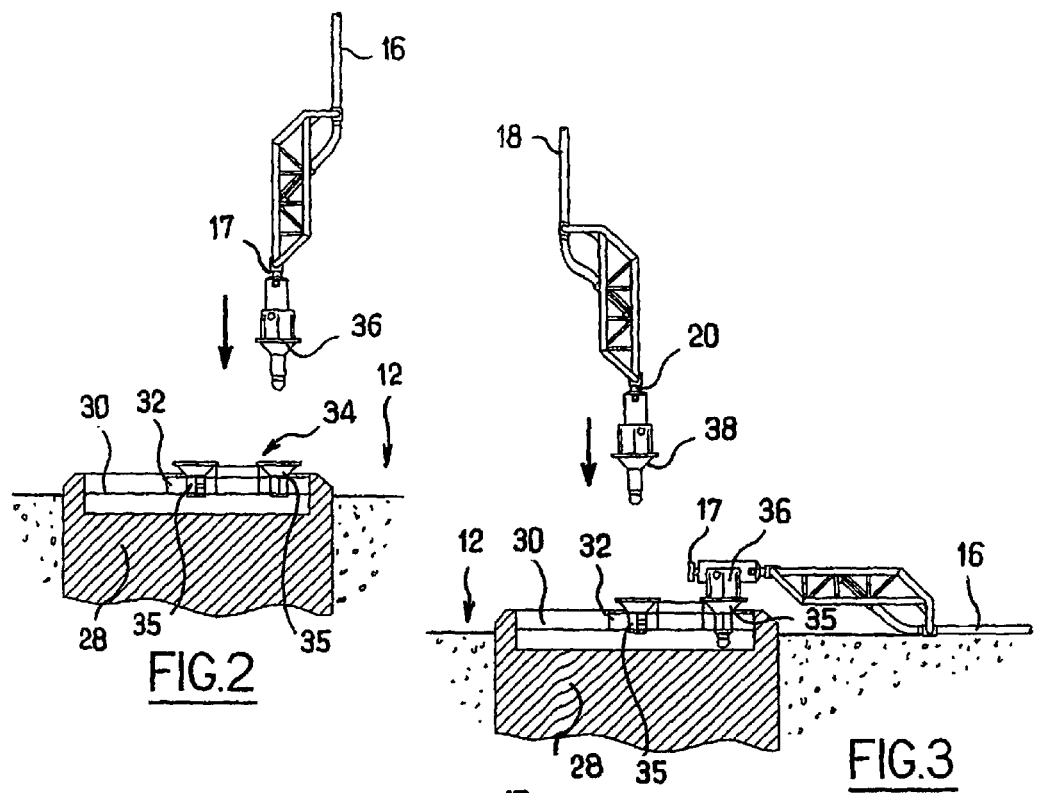
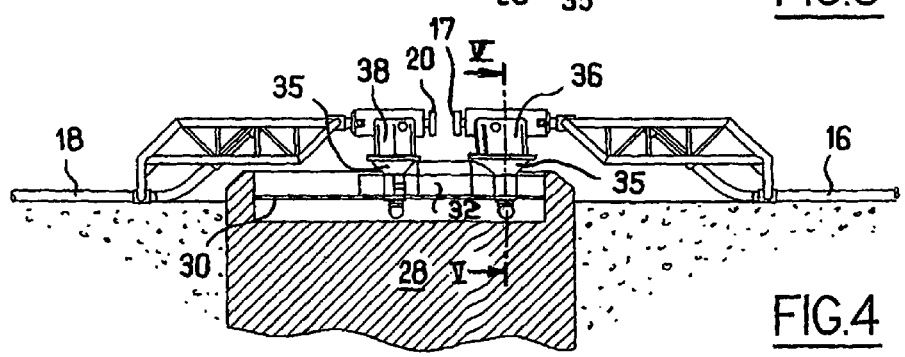
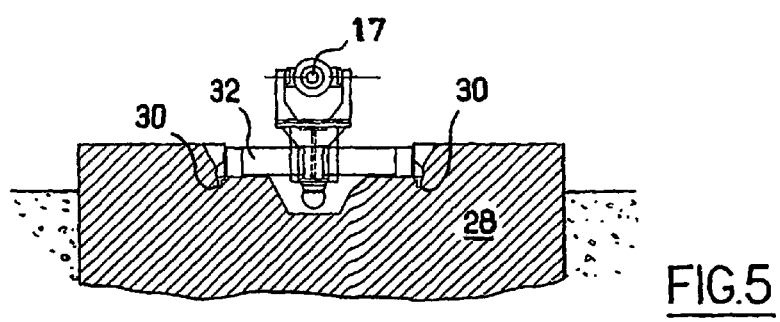

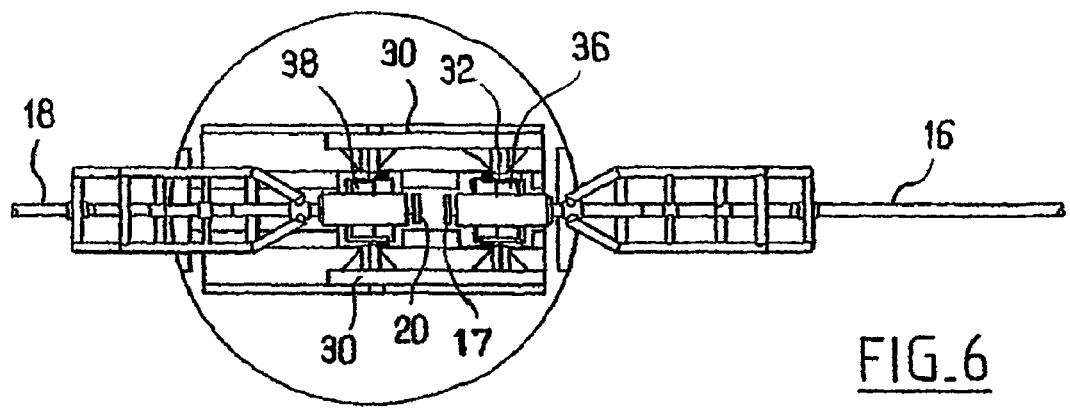
FIG_6
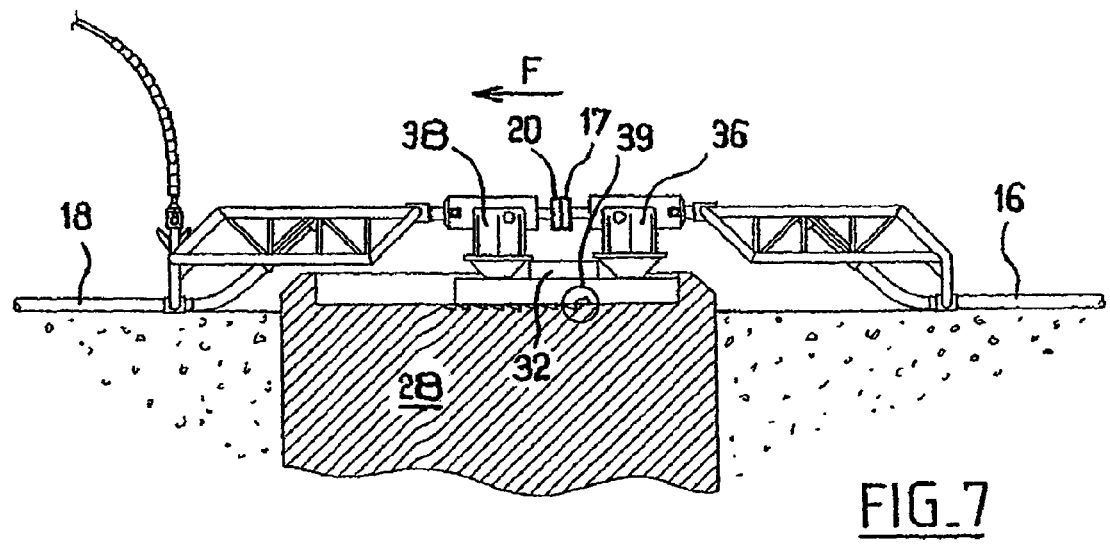
FIG_7
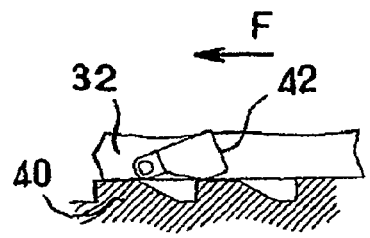
FIG_8A
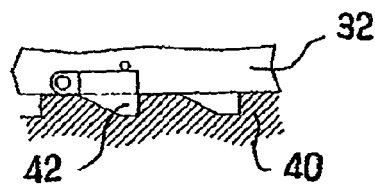
FIG_8B

METHOD AND SYSTEM FOR STARTING UP A PIPELINE

CROSS REFERENCE TO RELATED APPLICATION

The present application is a 35 U.S.C. §§371 national phase conversion of PCT/FR2005/000558, filed 9 Mar. 2005, which claims priority of French Application No. 0402695, filed 16 Mar. 2004. The PCT International Application was published in the French language.

BACKGROUND OF THE INVENTION

The present invention refers to a method and a system for starting up a flowline suitable for conveying hydrocarbons for offshore production.

According to previously known methods, the flowline, a rigid-type pipeline for example, is first extended over the seabed and connected to an oil production wellhead or to a multiplicity of wellheads and its joint end is then connected to the free end of a subsea riser extended in a catenary, which can itself be rigid. This subsea riser is intended for linking to a surface installation, such as a platform for example.

To make this connection, a known method involves connecting horizontally the subsea riser to the joint end of the flowline, essentially parallel to the seabed surface.

After making the connections, flowline start-up involves conveying hydrocarbon, which arrives at the wellhead, through the flowline and the subsea riser up to the surface installation.

The subsea riser is therefore placed completely on the seabed before making the connection using remote-controlled robots (Remotely Operated Vehicle or ROV), which position themselves either on the flowline for pulling the subsea riser with a cable or on the free end of the subsea riser for drawing it as far as the joint end of the flowline. The other end of the subsea riser is then raised up to the surface installation.

Such a method is notably illustrated in document U.S. Pat. No. 5,975,803. However, other known methods allow the same result to be achieved.

The subsea riser therefore has a free end, which is connected to said joint end of said flowline, a first section, which extends over the seabed from this free end and a rising section, which extends asymptotically, right below the surface installation. A so-called touch-down zone, which corresponds to a dynamic area of the riser, between the first section and the rising section is able to feature a touch-down point which, in turn, is pulled against the seabed, especially by surface installation movements.

The flow line, for its part, is able to deform longitudinally.

In a rigid pipeline, the hydrocarbon passing through the wellhead is, moreover, hot, which causes expansion and elongation of the flowline. In flexible flowlines, injection of fluid under pressure inside also causes their elongation.

The result of this is that movement of the joint end of the flowline and the first section of the subsea riser is produced over a distance of the order of 1 meter, for example 5 meters.

However, the hydrocarbon pressure is not necessarily constant throughout the flowline and, furthermore, supply to the flowline can cease either because of an incident or to allow performance of a maintenance operation at the wellhead.

There is therefore a drawback in dimensional variations of the flowline associated with heating or cooling of the flowline or a pressure variation, which can then cause not only friction of said first section of subsea riser on the seabed, which can be abrasive, but also variation in the radius of curvature of the subsea riser between this section and the rising section or even displacement of the touch-down point position on the pipeline. These drawbacks contribute to its damage in particular.

According to the prior art illustrated in FIG. 1A, the above-mentioned drawbacks are overcome by connecting the riser to the flowline using a flexible pipe. This FIG. 1A shows a riser 1, which extends between a free end anchored in the seabed and a surface installation 2, and a flowline 3, whose joint end 4, also anchored, is connected to the riser 1 by a flexible pipe 5. A first section 6 of the riser 1 is moored to the blocks 7 outside the axis of the flowline 3 such that dimensional variations in the flowline 3 are compensated by deformation of the flexible pipe 5. The latter can, moreover, comprise a rigid U-shaped pipe member capable of deformation.

Implementation of such a system is uneconomical, given the different anchor points to be created.

A problem raised, which the present invention aims to solve, is to propose a method and system for starting up a flowline, which allows the service life of subsea risers to be prolonged by preventing their friction on the seabed and their deformation, at an advantageous cost.

SUMMARY OF THE INVENTION

With this purpose and according to a first object, the present invention proposes a method for starting up a flowline suitable for conveying hydrocarbons, said flowline being extended over the seabed from a wellhead and terminating at a joint end, said joint end being suitable for connection to a subsea riser extended in a catenary, said method comprising a first stage, in which elongation of said flowline is induced; said method comprising moreover a second stage, in which said joint end is fixed with respect to said seabed to maintain said flowline in its stretched position.

One feature of the invention therefore resides in fixing the joint end of the flowline after it has been expanded and stretched, for example when hot fluid is made to circulate through said flowline, this hot fluid being, for example, hot water injected under pressure to test the flowline. In this way, when the flowline cools because the hot water is no longer injected or the initially hot hydrocarbon stagnates in the flowline, the latter tends to retract, which induces internal stresses because it is restrained at its joint end, but its longitudinal dimensions do not vary. As a result, flowline deformations no longer cause movements of the subsea riser, which is connected to it by the joint end, such that the latter is no longer damaged.

In a particularly advantageous way, displacement of said joint end is authorized in the direction of elongation of said flowline and displacement of said joint end is prohibited in the opposite direction. During said first stage, as the flowline deforms under the effect of temperature and stretches, its joint end therefore moves in translation and as soon as it cools and tends to retract, it is restrained under stress by the joint end, which itself is kept fixed in translation in the direction of retraction of the flowline. In this way, the flowline can be fixed in its maximum state of deformation.

Preferably, said joint end is guided in translation during elongation of said flowline such that the shape of the locking means, which will be hereafter described, can be simplified.

Moreover, at an advantageous preliminary stage, said flowline is laid on the seabed and said subsea riser is installed, then said subsea riser is connected to the joint end during said preliminary stage.

According to another object, the present invention proposes a system for starting up a flowline suitable for conveying hydrocarbons, said flowline being extended over the seabed from a wellhead and terminating at a joint end, said joint end being suitable for connection to a subsea riser extended in a catenary, said flowline being able to stretch; said system comprising locking means for fixing said joint end with respect to said seabed for maintaining said flowline in its stretched position.

Locking means, which are described in the remainder of the description, are solidly fixed to the seabed and are perfectly anchored therein, allow the joint end to be kept in a fixed position with respect to said seabed.

According to a particular embodiment, said locking means include unidirectional arresting means suited to allowing displacement of said joint end in the direction of elongation of said flowline and to prohibiting displacement of said joint end in the opposite direction. In this way, the joint end can move in the direction opposite to the elongating flowline, which pulls it, and, on the other hand, it is immobilized in the opposite direction with respect to the seabed.

Preferably, the system comprises guidance means including a moving trolley, to which said joint end is suitable for connection, said moving trolley being able to slide on means forming rails. In this way, the joint end is perfectly guided in translation on the seabed in one direction, although the flowline does not necessarily deform uniformly and in one direction.

The system comprises a base anchored in the seabed, said rails being solidly fixed to said base, to anchor perfectly the trolley and the joint end connected thereto. Clearly, such a base is suitable for withstanding the traction exerted by the flowline while remaining immobile with respect to the seabed.

According to one particularly advantageous implementation feature of the invention, said unidirectional means comprise means forming a rack, mounted in the direction of said means forming rails, and means forming a ratchet mounted on said trolley, said means forming a ratchet being suitable for engagement in said means forming a rack. The means forming a ratchet are therefore suitable for inclined engagement between two teeth of the rack for inhibiting the trolley in translation in one direction and from swinging over the teeth, when the trolley is pulled in the opposite direction by flowline elongation.

According to a particularly advantageous embodiment of the invention, said trolley comprises first reception means suitable for receiving said joint end of the flowline. In this way, as will be explained in greater detail in the remainder of the description, the flowline terminated by its joint end is suitable for installation in the reception means, which themselves are pre-installed, by unwinding said flowline from a surface vessel.

Furthermore, according to a particular embodiment of the invention, said trolley comprises, moreover, second reception means suitable for receiving a free end of said subsea riser for interconnecting said joint end and said free end after installation of the flowline.

Other particular features and advantages of the invention will become apparent on reading the description given below concerning particular embodiments of the invention, provided for information only but unlimited, in reference to the appended drawings.

BRIEF DESCRIPTION OF THE DRAWINGS

FIG. 2 is a diagrammatic elevation view illustrating elements of the system represented in FIG. 1B during a first phase of a preliminary stage of the installation method;

FIG. 3 is a diagrammatic elevation view illustrating elements of the system represented in FIG. 1B during a second phase of the preliminary stage;

FIG. 4 is a diagrammatic elevation view illustrating elements of the system represented in FIGS. 2 and 3 at the end of the second phase;

FIG. 5 is a diagrammatic view of a vertical section V-V through an element illustrated in FIG. 4;

FIG. 6 is a diagrammatic plan view of elements illustrated in FIG. 4;

FIG. 7 illustrates the system during an intermediate connection phase between the preliminary stage and a first stage, at which hot fluid is made to circulate through the flowline;

FIG. 8 is a diagrammatic view of details showing two possible states of an element represented in FIG. 7;

DESCRIPTION OF PREFERRED EMBODIMENTS

Structural elements of the system according to the invention and, in parallel, its method of installation will be described with reference to FIGS. 1 to 10.

Figure 1A:
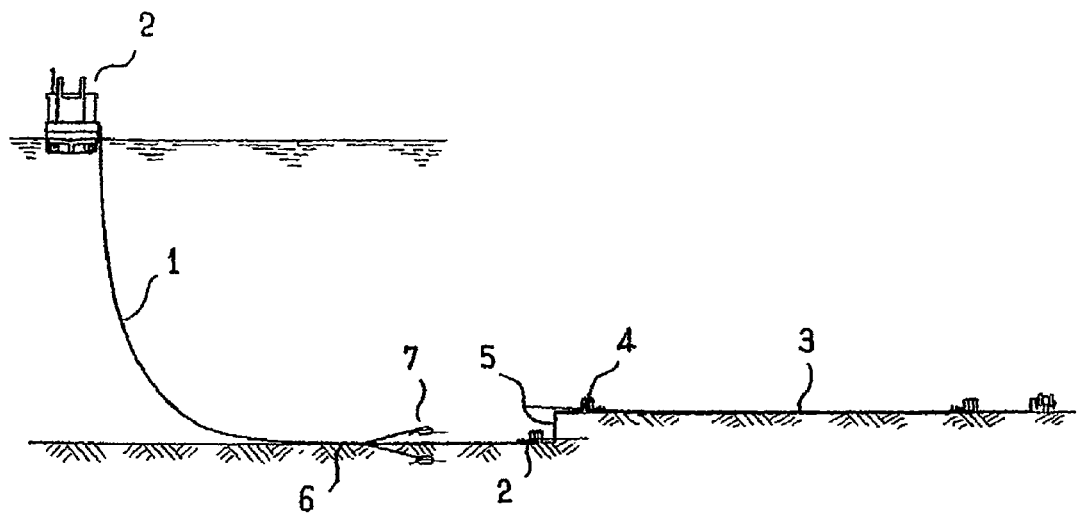
FIG. 1A is a diagrammatic vertical cross-sectional view of a system according to the prior art.
Figure 1B:
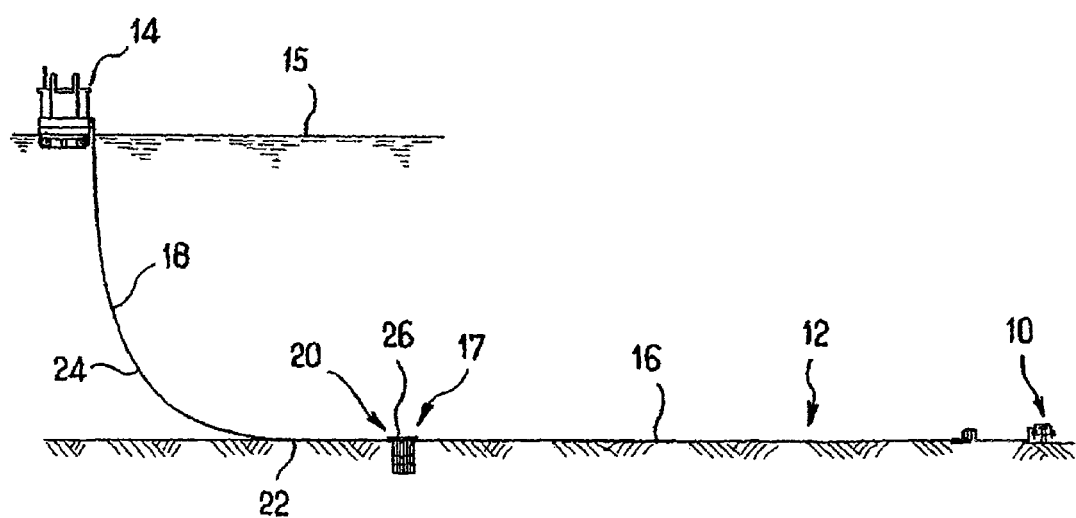
FIG. 1B is a diagrammatic vertical cross-sectional view of a system according to the invention.

FIG. 1B illustrates a system according to the invention between a wellhead 10 located on the seabed 12 and a surface installation 14 suitable for recovering a hydrocarbon and which is floating on the water surface 15. This system comprises a flowline 16 terminating in a joint end 17, which rests on the seabed 12, and a subsea riser 18, which prolongs it which joins the surface installation 14.

Prior to connection, this riser 18 has a free end 20, a first section 22, which rests on the seabed, and an asymptotic section 24, which joins the surface installation 14.

An essential feature of the invention, which will be detailed hereafter, resides in the connection means 26 between the flowline 16 and the riser 18, which allow prevention of relative movements of the joint end 17 and thus of the riser 18 resulting from deformation of the flowline under the effect of temperature or pressure variations.

Reference is now made to FIGS. 2 and 3 illustrating in detail the method of installing the flowline 16 and the riser 18.

FIG. 2 shows the seabed 12 and the joint end 17 of the flowline 16 during installation.

Prior to installation, a block or base 28 is anchored in the seabed 12 at a determined distance from the wellhead 10. This base 28 has rails 30 or slideways and a moving trolley 32 running on these rails 30 in a direction oriented toward the wellhead 10 and which will be detailed in the remainder of the description. The trolley 32 is here in an inactive initial position offset toward the wellhead 10. Furthermore, the trolley 32 has converging tubular reception means 34 comprising two reception parts 35 forming a funnel, suitable for receiving a first connection unit 36, which is itself mounted swiveling at the joint end 17.

The flowline 16 is therefore laid from an unrepresented surface vessel 18 located above the base and it then extends more or less vertically between the water surface 15 and the seabed 12. The joint end 17 is then guided, whilst laying the flowline, such that the connection unit 36 is vertically adjusted within the reception part 35, located toward the wellhead. It is understood that all the well-known methods of laying rigid pipes are suitable for implementation, especially the methods of laying known as "J" or "S" methods.

Subsequently, the entire flowline 16 is laid out toward the wellhead 10, and it swivels at its joint end which is then held in a fixed position in a substantially horizontal plane, parallel to the seabed 12, by virtue of the connection unit 36 which is itself held in the reception part 35, itself solidly fixed to the trolley 32 and the base 28.

FIG. 3 shows the flowline 16 installed in this way. After swiveling the flowline 16, the joint end 17 is released and oriented in the direction of the other connection part 35.

The riser 18, which has a second connection unit 38 mounted swiveling on the free end 20, will be similarly installed and connected to the other reception part 35. After unwinding the riser 18 such that its first section 22 is laid in contact with the seabed 12 in line with the flowline 16 but in the opposite direction, its free end, which has swiveled, is then positioned facing the joint end 17 of the flowline 16.

FIGS. 4 and 5 show the joint end 17 facing and at a distance of one meter, for example, from the free end 20, the trolley 32 itself always remaining in its initial inactive position.

Moreover, the joint end 17 and/or the free end 20 are respectively mounted sliding in a sleeve, which itself is mounted swiveling on connection units 36 and 38 respectively. In this way, using a Remotely Operated Vehicle (ROV), the two facing ends 17 and 20 will be brought close to one another and imperviously interconnected to ensure passing of hydrocarbon from the flowline 16 to the riser 18 without leakage.

FIG. 7 also shows the two pipelines 16 and 18 connected by their ends 17 and 20. The preceding installation phases constitute a preliminary stage of the implementation method and, from the position in which the pipelines are connected, as illustrated in FIG. 7, a second stage involves starting up the pipelines by injecting hot water, for example, into the flowline 16 from the wellhead 10 for checking and testing all the pipelines. The hot water is thereby recovered at a surface end of the riser 18.

In the same way as the hot hydrocarbon, which will circulate through it, this hot fluid causes elongation of the flowline 16 such that the joint end 17 and the free end 20, which is now connected to it, are caused to move in a direction opposite to the wellhead 10, in the direction of arrow F.

The trolley 32, which is solidly fixed in translation to the pipeline ends will therefore be similarly driven in translation along the rails 30 or slideways from its initial position, as also represented in FIG. 7 and in the direction of arrow F.

However, displacement in translation of the trolley 32 in the direction of arrow F away from the wellhead, is authorized, while displacement toward the wellhead is prohibited due to unidirectional arresting means 39, which will be described in detail with reference to FIGS. 5 and 8.

Dimensional variations in the flowline occur here after installation and connection of the flowline and the riser, which are then started up. Nevertheless, according to an alternative embodiment, installation and pressure testing of the flowline is envisaged prior to its connection. In this case, the joint end of the flowline is inhibited in translation in the same way as before, after elongating the flowline by pressurization. The riser is then able to be installed and connected to the flowline.

FIG. 5 illustrates a vertical cross section of the trolley 32 and the base 28, on which the trolley rests through the rails 30. Furthermore, a rack 42 is mounted solidly on the base 28 on each side of the trolley 32 near the rails 30 and extends parallel to the rails 30 with teeth oriented in the direction of arrow F.

FIG. 8 shows part of the rack 40 and part of the chassis of trolley 32, which is suitable for sliding parallel to the rack 40. Moreover, FIG. 8 illustrates a moving part 42 forming a ratchet in two possible states. A first state shown in FIG. 8A, in which the moving part 42 has swung over a tooth of the rack 40 and a second state shown in FIG. 8B, in which the moving part 42 is engaged between two teeth of the rack 40. Trolley 32 is therefore capable of being driven in translation in the direction of arrow F, the moving part 42 then being suited to swinging over the teeth and being inhibited in the direction opposite to arrow F, the moving part 42 then being engaged between the teeth.

Furthermore, the trolley 32 is sufficiently heavy and is maintained so as to slide on the rails 30 in such a way that it is inhibited vertically, in order, on the one hand, to prevent the trolley 32 from leaving the rails 30 and, on the other hand, to prevent the moving parts 42 escaping from the racks 40.

Thus, the trolley 32 is caused to move in the direction of arrow F, away from the wellhead 10, as the flowline deforms longitudinally. On the other hand, as soon as the temperature of the fluid passing through the flowline 16 reduces, it is inhibited by trolley 32, which is itself inhibited in translation.

Figure 9:
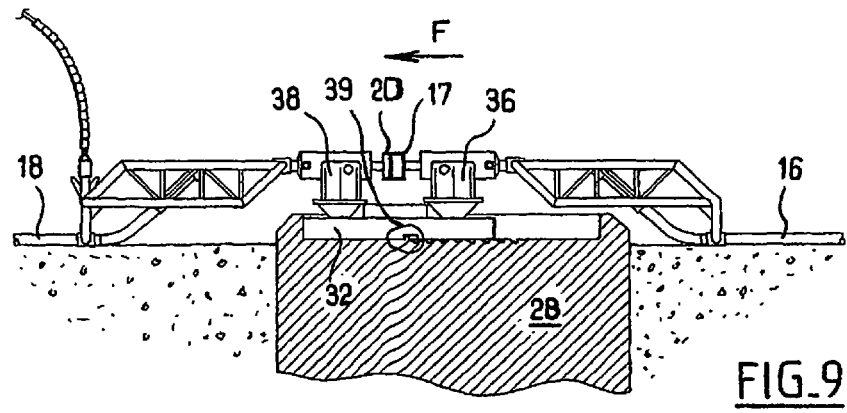
FIG. 9 is a diagrammatic elevation view of the system illustrated in FIG. 7 at a second stage.

Therefore, in a situation of maximum deformation, as illustrated in FIG. 9, the trolley 32 is locked in a maximum active position and cannot return to its initial position unless the moving parts 42 are released. As a result, once the system has been started up under normal operating conditions, temperature or pressure variations in the flowline no longer cause elongation of the flowline, which is then fixed in its position of maximum elongation.

Figure 10:
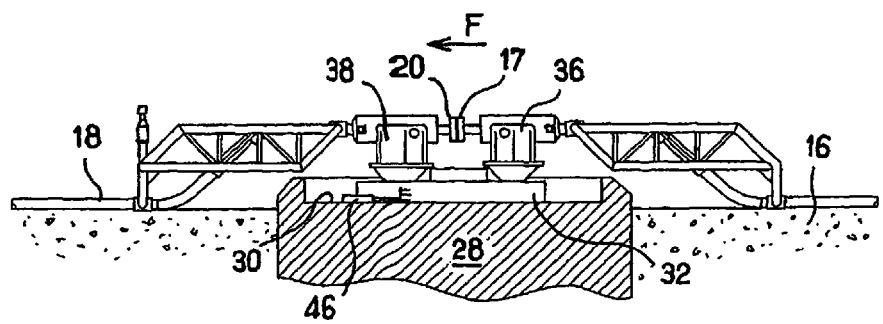
FIG. 10 is a diagrammatic elevation view of the system illustrated in FIG. 9 at an adjustment phase.

Nevertheless, displacement means illustrated in FIG. 10 are provided and are intended for re-adjusting the position of the trolley on the base 28 to offset the position of the touchdown point on the riser to prolong its service life. The point of contact of the riser on the seabed is therefore displaced by varying the relative position of the free end of the riser 18 and of the surface installation.

These displacement means comprise, for example, a hydraulic pressure cylinder with one end solidly fixed to the rails 30 and the other end solidly fixed to the trolley 32.

Figure 11:
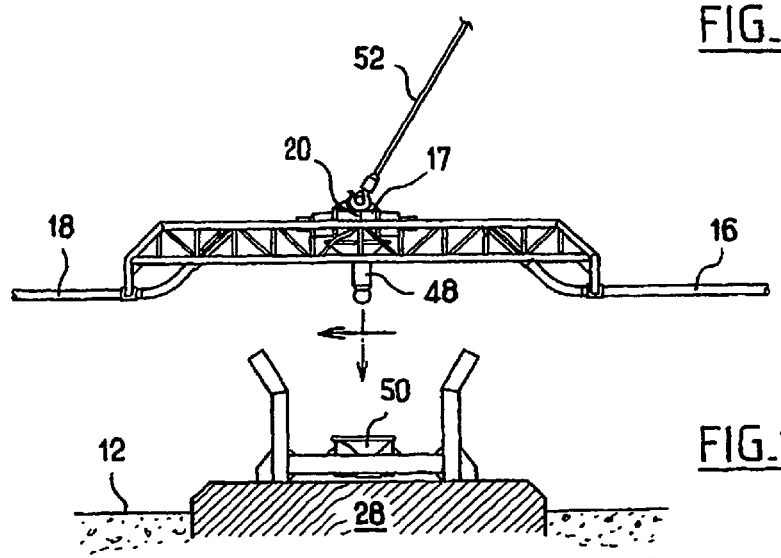
FIG. 11 shows elements of a system according to an alternative embodiment during a preliminary phase of the implemented method.

Moreover, according to another alternative embodiment of the invention, illustrated in FIG. 11 showing the base 28, the flowline 16 and the riser 18 during installation, the joint ends 20 and 17 are pre-connected on the laying vessel and the connection, which is fitted with a single connection unit 48 to be adjusted in a single reception part 50, is guided toward the base 28 using a sling 52.

Thereafter and in the same way as in the preceding variation, the reception part 50, which is solidly fixed to a trolley, will be driven in translation in the direction of arrow F under the effect of elongation of the flowline 16 and will be inhibited in translation in the opposite direction.

The invention claimed is:
1. A system for starting up a flowline suitable for conveying hydrocarbons, the system comprising:
   a flowline extended over a seabed from a wellhead and terminating at a joint end of said flowline, said joint end being suitable for connection to a subsea riser, and said flowline being operable to stretch;
   a locking system for fixing said joint end with respect to said seabed for maintaining said flowline in a stretched position after said flowline has been stretched, said locking system including a unidirectional arresting device operable to allow displacement of said joint end in a direction of elongation of said flowline and to prohibit displacement of said joint end in an opposite direction;

a guidance system including a movable trolley, said joint end is being connectable to said trolley; and a slide device on which said movable trolley is slidable in said direction of elongation of said flowline.

2. The system as claimed in claim 1, wherein said slide device comprises a rail extending in said direction of elongation along which said trolley is slidable.

3. The system as claimed in claim 2, wherein said slide device comprises a base anchored in said seabed, and said rail is fixed to said base.

4. The system as claimed in claim 2, wherein said unidirectional arresting device comprises a rack, mounted in the direction of said rail, and a ratchet on said trolley engageable in said rack for allowing displacement of said trolley as said flowline is stretched and for prohibiting return displacement of said trolley.

5. The system as claimed in claim 1, wherein said trolley comprises a reception device operable for receiving said joint end of said flow line.

6. The system as claimed in claim 5, further comprising a subsea riser having a free end; said trolley comprises a second reception device operable for receiving a free end of said subsea riser for enabling interconnecting said joint end of said flow line and said free end of said subsea riser.

7. The system as claimed in claim 1, further comprising a subsea riser having a free end; said trolley comprises a reception device operable for receiving said free end of said subsea riser for interconnecting said joint end of said flow line and said free end of said subsea riser.

\* \* \* \* \*